United States Patent [19]
Mead

[11] Patent Number: 6,088,484
[45] Date of Patent: *Jul. 11, 2000

[54] DOWNLOADING OF PERSONALIZATION LAYERS FOR SYMBOLICALLY COMPRESSED OBJECTS

[75] Inventor: Donald C. Mead, Carlsbad, Calif.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,586

[22] Filed: Nov. 8, 1996

[51] Int. Cl.$^7$ ................................................. G06K 9/36
[52] U.S. Cl. ................................................. 382/232
[58] Field of Search ................................ 382/253, 232, 382/233, 240, 241, 242, 243, 245, 118, 190, 305; 348/14, 15, 17, 19; 392/500

[56] References Cited

U.S. PATENT DOCUMENTS

| | | | |
|---|---|---|---|
| 4,606,069 | 8/1986 | Johnsen | 382/243 |
| 4,739,398 | 4/1988 | Thomas et al. | 382/190 |
| 4,783,841 | 11/1988 | Crayson | 382/243 |
| 4,847,677 | 7/1989 | Music et al. | 382/245 |
| 4,905,163 | 2/1990 | Garber et al. | 364/513 |
| 5,122,875 | 6/1992 | Raychaudhuri et al. | 382/232 |
| 5,136,659 | 8/1992 | Kaneko et al. | 382/243 |
| 5,214,721 | 5/1993 | Fukuhara et al. | 382/243 |
| 5,247,590 | 9/1993 | Fukuhara et al. | 382/243 |
| 5,461,679 | 10/1995 | Normice et al. | 382/305 |
| 5,500,673 | 3/1996 | Zhou | 382/118 |
| 5,596,659 | 1/1997 | Normile et al. | 382/253 |
| 5,635,929 | 6/1997 | Rabowsky et al. | 341/50 |
| 5,646,866 | 7/1997 | Coelho et al. | 395/502 |
| 5,649,029 | 7/1997 | Galbi | 382/233 |
| 5,657,416 | 8/1997 | Boon | 382/246 |
| 5,680,512 | 10/1997 | Rabowsky et al. | 395/2.95 |
| 5,708,473 | 1/1998 | Mead | 348/416 |
| 5,734,755 | 3/1998 | Ramchandran et al. | 382/250 |
| 5,748,789 | 5/1998 | Lee et al. | 382/243 |
| 5,764,808 | 6/1998 | O'Connell et al. | 382/243 |
| 5,782,429 | 7/1998 | Mead | 382/238 |
| 5,793,903 | 8/1998 | Lopresti et al. | 382/309 |
| 5,825,830 | 10/1998 | Kopf | 382/239 |
| 5,855,339 | 1/1999 | Mead et al. | 244/3.11 |
| 5,861,920 | 1/1999 | Mead et al. | 348/390 |
| 5,864,862 | 1/1999 | Kriens et al. | 395/683 |
| 5,870,094 | 2/1999 | Deering | 382/243 |
| 5,883,673 | 3/1999 | Miyamoto | 382/243 |
| 5,926,575 | 7/1999 | Ohzeki et al. | 382/243 |

*Primary Examiner*—Jose L. Couso
*Attorney, Agent, or Firm*—John A. Crook; Michael W. Sales

[57] ABSTRACT

A method and apparatus for transferring data signals with personalization layers for symbolically compressed objects comprises a transmitter having an encoder and a receiver having a decoder. The encoder includes a segment selector for identifying signal segments from a group of speech, audio, video, and graphic signals, each segment comprising a representation of a physical waveform. The encoder includes a plurality of encoder libraries, one of the libraries containing the representation of a generic waveform and a symbolic code for the generic object. The decoder has a second plurality of libraries corresponding to the plurality of encoder libraries, and contain the generic waveform, the symbolic code corresponding to the generic physical waveform, and the difference information quantity as a personalization layer of data representing the difference between the generic object code and the waveform from which the generic object was extracted.

18 Claims, 5 Drawing Sheets

DOWNLOADING OF PERSONALIZATION LAYERS FOR SYMBOLICALLY COMPRESSED OBJECTS

TECHNICAL FIELD

The present invention relates generally to methods and systems for information transmission with digital signal processing including encoding and decoding signals representing aural or visual communication including personalization with an object library.

BACKGROUND OF THE INVENTION

Data compression systems reduce the number of bits needed to transmit and store a digital information signal. As a result, a lower bandwidth communication channel can be employed to transmit a compressed video signal in comparison to an uncompressed video signal. Similarly, a similar, reduced capacity storage device, which can comprise a memory or a magnetic storage medium, can be used for storing the compressed video signal. A general information signal compression system includes an encoder, which converts the video signal into a compressed signal, and a decoder, which reconstructs the video signal based upon the compressed signal.

In the design of a video compression system, an objective is to reduce the number of bits needed to represent the video signal while preserving its information content. Previous methods and systems for video compression have achieved a reasonable quality of content preservation at transmission bit rates of 40 to 60 to 1 less than the original. These methods and systems are based upon directly compressing a waveform representation of the video signal. An alternative compression format utilizes a limited collection of predetermined library objects that symbolically represent waveform portions in a reduced amount of bits. However, the previously known compression formats are accessible only in response to receipt of an appropriate signal. Moreover, symbolic compression has been limited to generic objects and does not fully compress the details of a particular aural or visual signal content.

SUMMARY OF THE INVENTION

The need exists for a compression system which significantly reduces the number of bits needed to transmit and store an information signal, regardless of its content, while preserving the content integrity of the signal. In general, the transmission system of the present invention includes an encoder and decoder that contain corresponding segment libraries with a plurality of objects and with difference signals for personalizing the object for a plurality of speech, music, video, or graphic information, and a segment selector responsive to the signals received. As a result, the present invention significantly reduces the bit rate needed to transmit, or the bit capacity of a storage device to store, a signal, and reduce the bandwidth of the transmission signal needed to communicate the content.

The present invention also provides a symbolic encoding and decoding of speech or music signals representing aural messages or video and graphic signals representing visual content. The present invention also provides a system for encoding an information signal that contains aural or visual signal content components or information quantities, into a bit stream, and reproducing a substantial portion by symbolic code transmission. An object encoder assigns a symbolic code to an object contained in one of the segments of the library. The symbolic code identifies a corresponding object from a set of generic objects, and personalizing information other than that matching generic objects is computed by processing a difference signal based upon a difference between the actual object portrayed and the corresponding generic object in the library. A multiplexer provides the bit stream based upon the coded difference signal, and the coded unrecognized signal, and the symbolic codes. Preferably, the personalization layer is sent once as a header at the initiation of transmission, and need not be continuously conveyed.

The present invention provides a system for encoding a signal into a bit stream, wherein the transmitted signal is representative of at least one of an object of speech, audio, video and graphic segments. An image segmenter segments each type of the signal for parsing into a plurality of objects. A feature extractor, coupled to the image segmenter, forms at least one information feature quantity for each of the objects. A classifier, coupled to the feature extractor and to a first storage device containing a set of generic objects in a library, recognizes at least one of the objects as matching a corresponding generic library object having the at least one feature quantity. A symbolic code for this generic object of that segment is used to designate the object, and coded remaining information, are multiplexed and transmitted to a receiver. A difference processor produces a difference signal designating the personalization differences between the generic object such as a human head, and the portrayal represented in the transmission signal, for example, a particular person's head. The difference processor preferably includes a second storage device in which a representation of the difference signal is stored.

When the segment includes video image components, a motion estimator can provide a motion compensation signal based upon the motion of at least one of the objects from a first frame to a second frame. A multiplexer then provides the bit stream based upon the symbolic code, the difference signal, the remaining signal, and the motion compensation signal. Nevertheless, the present invention provides methods of encoding and decoding speech, audio, graphic or video signal components into a bit stream.

The present invention also provides a method and a system for reconstructing an object and other information in the segment from a bit stream with symbols representative of generic objects and differences from the generic objects in segment signals. In a receiver, a demultiplexer extracts a symbolic code and a difference signal from the encoded video signal. The symbolic code identifies a corresponding object from a set of a library of objects, and a variable length code (VLC) signal represents a signal including the difference signal representing difference between an object and the generic object as well as the symbolic code and the unrecognized object material. An object generator contributes to the output signal by generating the corresponding object waveform identified by the symbolic code, and modifying the general object in dependence upon the difference signal.

BRIEF DESCRIPTION OF THE DRAWINGS

The present invention will be better understood by reference to the following detailed description of a preferred embodiment when read in conjunction with the accompanying drawings, in which like reference characters refer to like parts throughout the views, and in which.

BEST MODES FOR CARRYING OUT THE INVENTION

Figure 1:
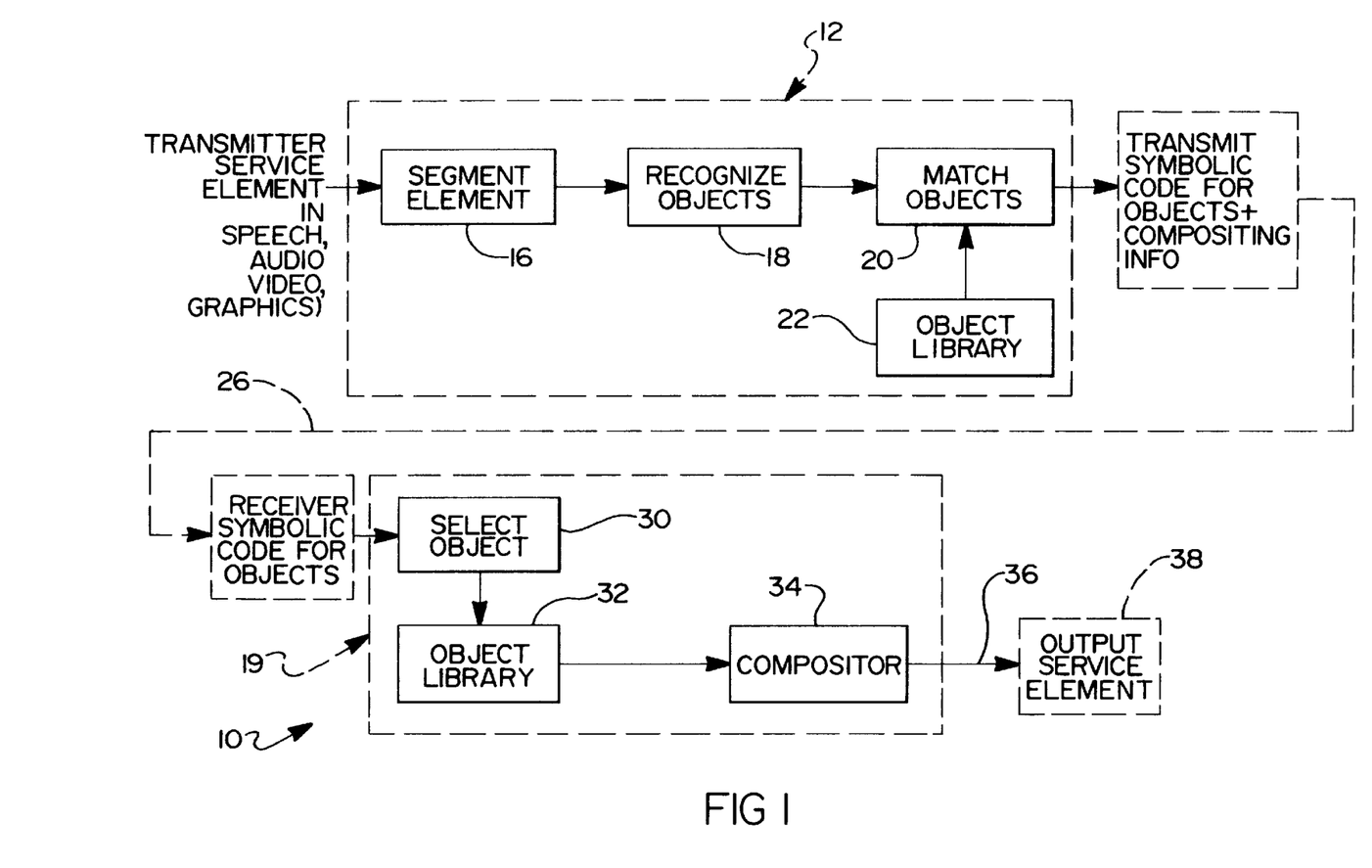
FIG. 1 is a block diagram of an embodiment of a signal transmission system including an encoder and a decoder in accordance with the present invention.

Referring first to FIG. 1, a communication system combines a transmitter 11 having an encoder 12 and a receiver 13 including a decoder 14. Both system portions recognize objects within an information or data signal regardless of content including aural content representative signals for speech or audio, or visual content representative signals for graphics or a video image, and then classify the objects with symbolic identifiers. Differences between the recognized object and the closest representation in a library of segments are computed by difference processing and coded for transmission along with a coded symbolic representation of the objects. The data is multiplexed into a bit stream 26 for either transmission or storage.

As illustrated by the block diagram in FIG. 1, the encoder 12 provides a system for encoding a signal into a bit stream for transmission to a corresponding decoder 14. A signal can be a speech signal, an audio signal representing musical content, a video signal representative of one or more frames of video footage, or a graphical signal representation of still art.

The input signal of any type is segmented according to its type, and objects carried by the signal are recognized as shown at 18. The recognized objects are then matched with symbolic codes for the objects in a generic object library 22 to produce an output 24 that combines the symbolic code for each object that matches the library object and the unmatched compositing. The processing includes difference processing to determine the personal details of the object now represented by a generic object code. Likewise, after transmission or storage, as diagrammatically represented at 26, the bit stream containing symbolic codes for the objects and the compositing information including coded difference signals and coded unrecognized information signals, are received at the decoder 14. At the decoder 14, the symbolic code for objects is used to select objects from the object library 32 and provides a representative signal of the object reconstructed from the library 32. Compositing 34 then provides an output modifying the objects with personalization layers and supplemented with the non-object data 36 to service element 38, such as a video player. The decoder 14 can provide input to a receiver portion that transforms the information into audio or visual output, depending on the input.

Figure 2:
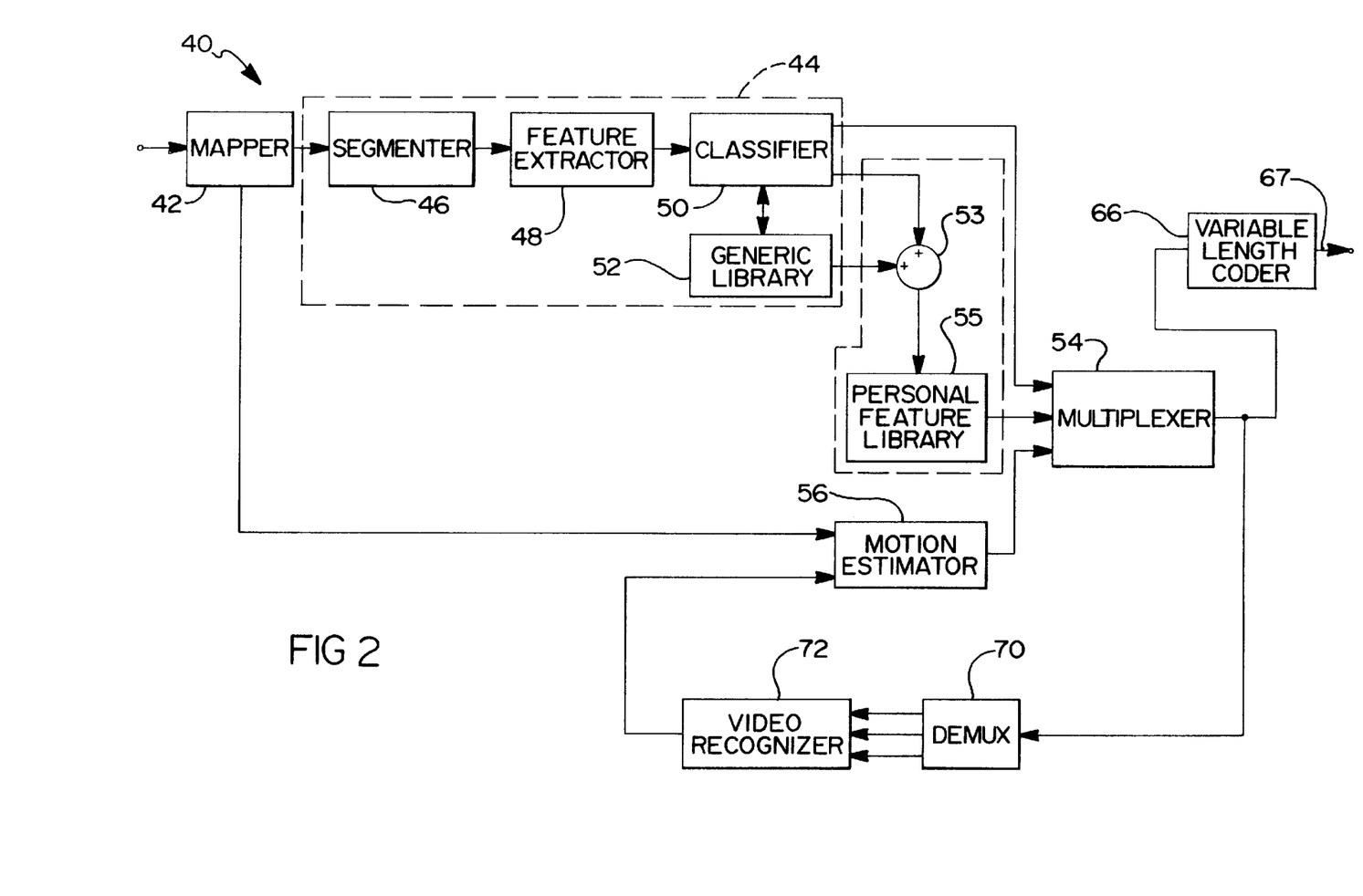
FIG. 2 is a block diagram of an encoder segment including a library with segment elements for symbolic representation of video content information and difference signals in the system of FIG. 1.

Referring now to FIG. 2, one segment 40 shows a preferred embodiment for encoding and decoding video information signals in accordance with the present invention. In a preferred embodiment, a video signal is in the form of an incoming digital bit stream representative of an uncompressed digital video signal, although alternative embodiments are not limited thereto. The mapper 42 maps pixels represented by the digital bit stream into an intermediate representation conducive to effective coding. More specifically, the mapper 42 performs a transform coding operation in forming the intermediate representation. The transform coding operation produces an output signal representative of a plurality of coefficients having reduced statistical correlation. The mapper 42 can employ standard transforms such as Karhunen-Loeve, discrete cosine, Fourier, and Hadamard, to name a few, as well as non-standard transforms as is known to persons of ordinary skill in the art.

The output of the mapper 42 is applied to an object encoder 44. The object encoder 44 extracts at least one object in the video frames, and assigns a symbolic code to each object based upon recognition of the object from a set of generic objects. The object encoder 44 includes an image segmenter 46 which subdivides an image into at least one object. For the purpose of this application, an object of an image can be representative of a constituent part of the image, a region of the image, or another entity of interest in the image. Examples of objects which are extracted by the image segmenter 46 include a human face, a hand, an arm, and a background. Various types of segmentation procedures can be employed by the image segmenter 46, as one with ordinary skill in the art of image processing will recognize.

The video segment object encoder 44 further includes a feature extractor 48, coupled to the image segmenter 46. The feature extractor 48 describes the at least one object based upon at least one feature quantity computed therefrom. In general, the feature extractor 48 reduces the representation of an object to a smaller number of components having sufficient information for discrimination therebetween. Various procedures for feature extraction can be employed by the feature extractor 48, as one with ordinary skill in the art of image processing will recognize.

Based upon the at least one feature quantity, each extracted object is compared by a classifier 50 to a set of generic objects, located in a generic library 52, for object recognition. The generic library 52, which is embodied by an electronic storage device, contains a corresponding symbolic code for each of the generic objects. As an example, for an extracted object comprising a human head, the feature extractor 48 can extract features based upon shape and color for use by the classifier 50 in comparing to known human heads in the generic library 52. Similarly, human facial models, backgrounds and image printing that are similar to clip art can be made available in the library 52. The classifier 50 then produces the symbolic code corresponding to the closest recognized object in the generic library 52 based upon the at least one feature quantity. In the above-described example, the symbolic code for the closest recognized human head would be outputted by the object encoder 22. In general, the object encoder 22 provides the symbolic code for each recognized object to a multiplexer 54.

An extracted object may not be recognized by any of the generic objects in the generic library 52. In this case, the classifier 50 can add any unrecognized objects to the generic library 52 to be used as references for future similar objects. In a preferred embodiment, the classifier 50 includes an expert system to perform the object recognition. The unrecognized objects are coded and the code is provided to the multiplexer 54 for transmission to a corresponding decoder.

Differences between a recognized object and a corresponding closest matching generic object are collected by a difference processor 51. More specifically, the difference processor 51, which is coupled to the object encoder 44, computes a difference signal in dependence upon the recognized object provided by the classifier 50 and the closest matching generic object within the generic library 52. This difference signal is computed by a differencing element 53. The language "difference processor" is used here. However, the difference processor to be employed in this invention is not a simple pixel subtractor described in prior art. Rather, this processor can make a wide variety of transformations in making the comparison. These should include (but not be limited to) the affine mappings of dilation, contraction, rotation, and shear. For example, consider the generic object, "bird". Not only would the size, shape, color etc. be compared but also viewing angles, lighting angles, wing positions, etc. A representation of the difference signal is stored within a personal feature library 55. In a preferred embodiment, the personal feature library 55 is formed by an electronic storage device, and the difference signal is represented by a personality file stored therein. The personality file may be formed utilizing a psycho visual model. The output of the difference processor 32 is provided to the multiplexer 54.

The video signal may be further applied to a motion estimator 56. The motion estimator 56 performs a frame-to-frame comparison of the video signal to determine whether any objects are in motion. In a similar manner, the motion estimator 56 determines whether an originating camera which produces the video signal is panning or scanning. In this case, the entire field of view, including stationary objects, would be in motion. Based upon these determinations, the motion estimator 56 produces a motion compensation signal representative of both object motion information and camera pan and scan information. For example, if a person is waving his/her arm, the arm would be an object for which the motion estimator would compute motion information. In a preferred embodiment, the motion compensation signal is represented by a motion compensation file. Various procedures for motion estimation can be employed by the motion estimator 56, as one with ordinary skill in the art of image processing will recognize. The motion compensation signal produced by the motion estimator 56 is provided to the multiplexer 54.

The multiplexer 54 multiplexes the symbolic code 58 provided by the view segment object encoder 44, the unrecognized signal portion 60, and the motion compensation signal 62 provided by the motion estimator 56, to produce a serial bit stream representative thereof. As a result, the bit stream 64 contains information related to the generic objects in the video image, a code representing the differences between actual extracted objects and the generic objects, and motion of the objects. Further, the bit stream 64 contains code for the unrecognized objects (including background) that may be added to the generic library. In a preferred embodiment, the multiplexer 54 formats the symbolic code, the personality code, the motion compensation file, and appropriate synchronization information to form the bit stream. The bit stream is applied to a variable length coder 66 or a similar entropy coder, in order to further reduce the number of bits needed to represent the video signal. The variable length coded bit stream is outputted for transmission to a corresponding decoder.

The variable length coded bit stream is produced from the output of the multiplexer 54. A demultiplexer 78 recovers the symbolic code, the personality file code, and the motion compensation file for application to a video reconstructor 72. The video reconstructor 72 reconstructs the video signal in accordance with procedure used by the corresponding decoder. The reconstructed video signal is applied to the motion estimator 56 to allow the motion compensation signal to be based thereupon.

In accordance with the present invention, the apparatus performs a method of encoding a video signal into a bit stream initiated by transform coding of the video signal. Based upon the transform coded video signal, the encoder extracts at least one object from the video image. Extracting can include segmenting the video image into one or more objects. Then the encoder computes one or more feature quantities for the at least one object. The encoder then classifies the at least one extracted object from a set of generic objects. Classifying may include comparing the one or more feature quantities to stored features of the generic objects. If classifying the object is unsuccessful, then the resulting unrecognized object may be added to the set of generic objects.

For each classified object, a symbolic code is assigned representative of the closest one of the generic objects. Computing a difference signal in dependence upon a difference between the recognized object and the closest one of the generic objects is performed. After computing a motion signal based upon the frame-to-frame motion of the objects, the video segment encoder 44 multiplexes the symbolic code, the difference signal, the code for the unrecognized material and the motion signal to form the bit stream. Variable length coding of the bit stream completes the segment encoding.

Figure 3:
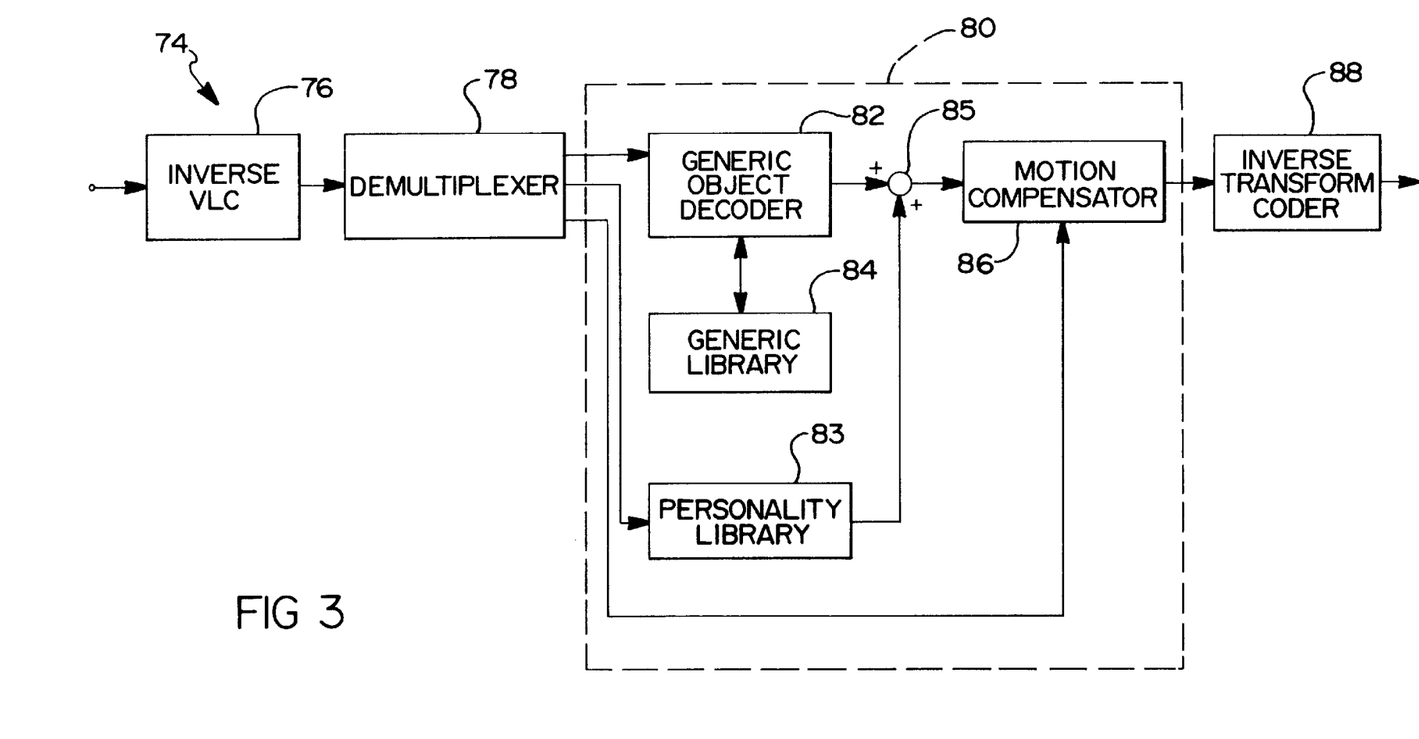
FIG. 3 is a block diagram of an embodiment of an decoder for the video content information and difference signals encoded in the apparatus of FIG. 2 in accordance with the present invention.

An embodiment of a video segment decoder 74 in accordance with the present invention is illustrated by the block diagram in FIG. 3. The decoder provides a system for reconstructing a video image from a bit stream 67 representative of an encoded video signal received from a corresponding encoder 44. The bit stream 67 enters an inverse variable length coder 76, or a like inverse entropy coder, which recreates the original multiplexer output. The decompressed bit stream is applied to a demultiplexer 78 which extracts a symbolic code, the code for the difference signal, the code for any unrecognized data and a motion compensation signal. A new object that was unrecognized in the encoder may also be contained in the bit stream. In a preferred embodiment, the demultiplexer 78 includes a synchronizer which generates an internal clock signal in order to lock onto the bit stream.

The extracted symbolic code, coded difference signal, code for unrecognized signal, and motion compensation signal are applied to an object generator 80. The object generator 80 includes a generic object decoder 82 and a generic object library 84 coupled thereto. The generic object library 84, which contains a set of generic objects and corresponding symbolic identification codes, that correspond to the content of library 52, is preferably embodied by an electronic storage device such as a non-volatile member, for example an EEPROM of the receiver 13. The generic object decoder 80 acts to generate a signal representing a generic object in the generic object library 84 that was represented by the extracted symbolic code. The generic object library 84 is updated upon receiving, within the bit stream, new objects which were unrecognized in the segment encoder 44. Hence, new objects added to the generic library 22 are also added to the generic object library 84 on a timely basis.

The extracted coded difference signal is applied to a personality library 83 within the object decoder 82. The personality library 83 stores the extracted decoded difference signal for modification of the generated generic object.

In a preferred embodiment, the personality library 83 comprises an electronic storage device. A summing element 85 representatively indicates the generated generic object being modified based upon the difference signal. While the summing devices 85 could be a simple adder, this invention is intended for use with much more sophisticated compositing, for example compositing devices which can blend the object edges for example. As an example, a generic human head object can be modified by the difference signal at this point to more closely resemble the human head in the original video image.

The extracted motion compensation signal is applied to a motion compensator 86. The motion compensator 86 modifies a location of the generated object in dependence upon the motion compensation signal.

The output of the object generator 80 is applied to an inverse transform coder 88. The inverse transform coder 88 performs an inverse of the coding operation performed by the mapper 42. The output of the inverse transform coder 88 provides a reconstructed video signal. In a preferred embodiment, the reconstructed video signal is in the form of a digital video bit stream.

In accordance with the present invention, the segment decoder 74 reconstructs a video image from an encoded video signal extracts a symbolic code from the encoded video signal, wherein the symbolic code identifies a corresponding generic object from a predetermined set of generic objects. A step of extracting a coded difference signal from the encoded video signal is performed. The difference signal is representative of a difference between an object and the corresponding generic object. The corresponding generic object identified by the symbolic code is modified in dependence upon the difference signal. In addition, the segment decoder 74 extracts a motion compensation signal from the encoded video signal and generates the video image signal reconstructed from objects, differences unrecognized objects and location modifications of the objects in dependence upon the motion compensation signal.

Figure 4:
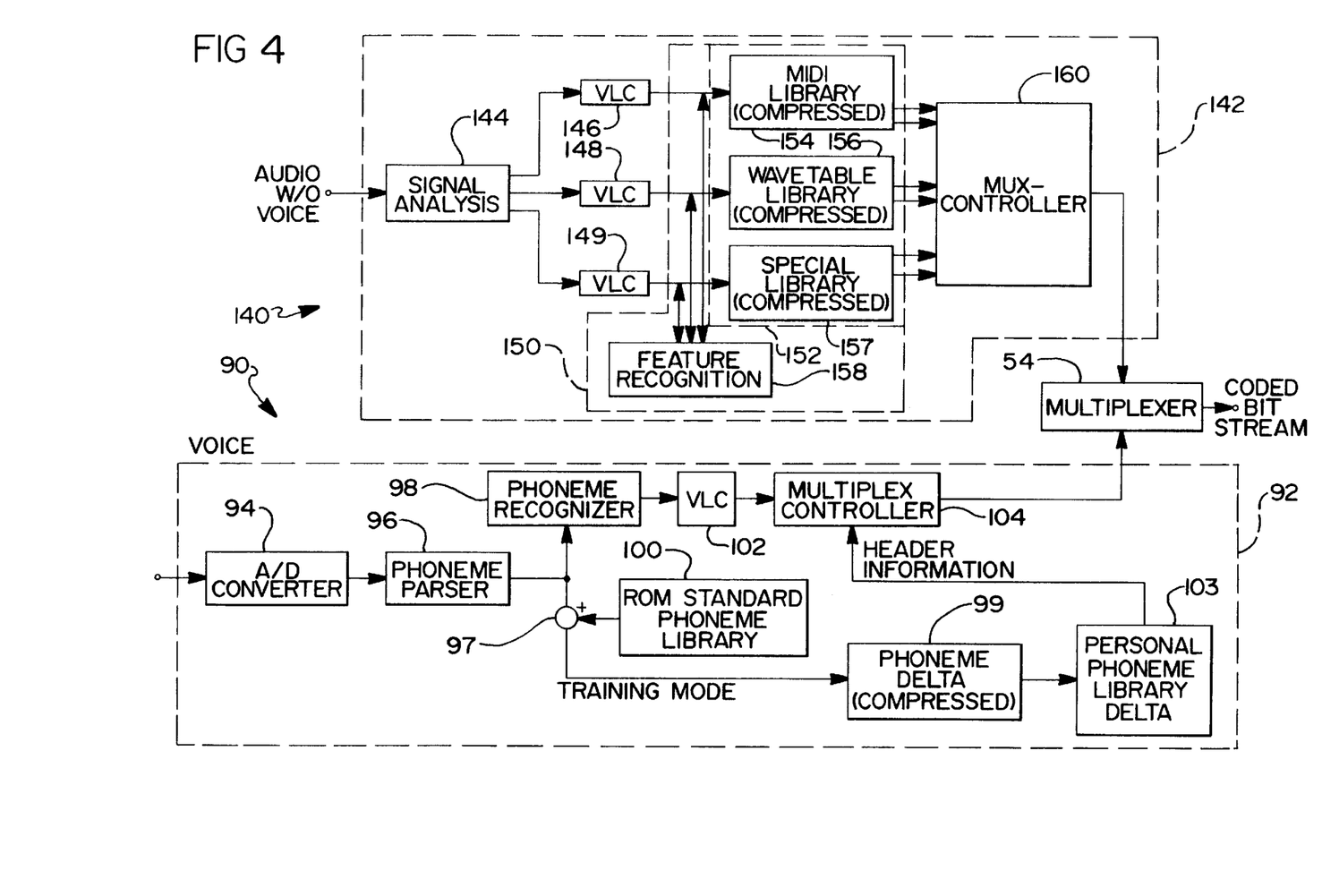
FIG. 4 is a block diagram of encoder segments including libraries with segment elements for symbolic representation of aural content information in the system of FIG. 1.

FIG. 4 shows the system for speech. The vocal audio signal is applied to a speech segment 90 including an encoder 92 which forms an encoded vocal signal. Similarly, an audio signal is applied to an audio segment 140 including a segment encoder 142 which forms an encoded nonvocal signal. A multiplexer, for example, the multiplexer 54, which is coupled to encoder 40, encoder 92 and the encoder 142, forms the bit stream by multiplexing the encoded signal. The multiplexer may produce a header containing the personality features from the personal feature library that can be transmitted once at the beginning of a communication session. The header data is then relied upon at decoding to personalize the communication data sent subsequently.

Upon entering the encoder 92, the vocal audio signal is applied to an analog-to-digital converter 94. The analog-to-digital converter 94 digitizes the vocal signal to form a digital vocal signal. If the vocal signal is already in a digital form, the analog-to-digital converter 92 is not required. A phoneme parser 96 is coupled to the analog-to-digital converter 94. The phoneme parser 22 identifies the time base for each phoneme contained within the digital vocal signal, and parses the digital vocal signal into at least one phoneme based upon the time base.

The phoneme parser 96 is coupled to a phoneme recognizer 98 which recognizes the at least one phoneme from a predetermined phoneme set in the phoneme library 100 of segment 90, and assigns a symbolic code to each the phoneme recognizer 98 assigns a unique six-bit symbolic code to each of the approximately forty phonemes in the English language or eight bits for a full international phoneme library. However, the number of bits needed for coding the phonemes is dependent upon the number of phonemes in the language of interest. In order to allow encoding of vocal audio which results from singing, the predetermined phoneme set may also include singing phonemes.

The symbolic code for recognized phonemes and the unrecognized data from the phoneme recognizer 98 are applied to a variable length coder 102. The variable length coder 102 provides a variable length code of the symbolic code based upon the relative likelihood of the corresponding phoneme to be spoken. More specifically, phonemes which occur frequently in typical speech are coded with shorter length codes, while phonemes which occur infrequently are coded with longer length codes. The variable length coder 102 is employed to reduce the average number of bits needed to represent a typical speech signal. In a preferred embodiment, the variable length coder is coupled to a multiplexer 104 which formats the variable length code into a serial bit stream.

The phoneme parser 96 is coupled to difference processor 97 which forms a difference signal between a user-spoken phoneme waveform and a corresponding waveform from a standard phoneme waveform library. The standard phoneme waveform library is contained within a first electronic storage device 100, such as a read-only memory, coupled to the difference processor 97. The first electronic storage device 100 contains a standard waveform representation of each phoneme from the predetermined phoneme set.

The difference signal is compressed by a data compressor 99 coupled to the output of the difference processor 97. A representation of the compressed difference signal is stored in a personality library 103, preferably a second electronic storage device. As a result, the second electronic storage device contains a personal phoneme library for the user of the decoder. The multiplexer 104 is coupled to the second electronic storage device 103 so that the bit stream provided thereby is based upon both the symbolic code generated by the phoneme recognizer 98 and the representation of the difference signal. In a preferred embodiment, the multiplexer 104 formats a header based upon the personal phoneme library upon an initiation of transmission. The header may be sent once early in a communication to reduce the quantity of data transmitted subsequently.

The combination of the difference processor 97, the phoneme library 100, the data compressor 99, and the personality layer library 103 forms a system which performs a personalization training of the encoder. Thus, in a predetermined training mode, the output of the phoneme parser 96 is compared to the standard phoneme waveform library, and a difference phoneme waveform, i.e. a delta phoneme waveform, is formed and compressed. The delta phoneme waveform is then stored in the personal phoneme library of the encoder for later transmission.

Still referring to FIG. 4, the audio segment 140 includes audio encoder 142 and a signal analyzer 144 which decompose the nonvocal audio signal into a plurality of decomposed signals based upon a corresponding plurality of predetermined signal classes. If the nonvocal audio signal is an analog signal, the signal analyzer 144 can include an analog-to-digital converter in order to provide a digital bit steam for further processing therewithin. In the embodiment of FIG. 4, two predetermined signal classes are defined: a MIDI class, a wavetable class, and a special library class. As such, the nonvocal audio signal segment is segregated into a MIDI bit stream, a wavetable bit stream, and a special library bit stream in dependence upon the type of sound in the nonvocal audio signal and the application. In some applications, it is not necessary to decompose the nonvocal audio signal. For instance, the nonvocal audio signal may be in the form of music generated by an instrument which directly produces a MIDI file. In these applications, the decomposed signals are directly applied to the second encoder 142 without having to employ the signal analyzer 144.

Optionally, each bit stream is applied to a corresponding variable length coder (VLC) 146, 148 and 149, respectively. Each VLC provides a variable length code that reduces the average number of bits needed to represent each bit stream.

The variable length coders 146, 148 and 149 are coupled to a feature recognizer 150. The feature recognizer 150 produces at least one symbolically coded identifier in dependence upon the nonvocal audio signal, and outputs the encoded nonvocal symbolic signal based upon the at least one coded identifier. The feature recognizer 150 includes at least one library 152 of prestored sound elements, and a symbolically coded identifier is representative of each sound element.

In the embodiment of FIG. 4, the feature recognizer 150 includes a MIDI library segment 154 which contains MIDI sound elements, a wavetable library 156 which contains wavetable sound elements, and a special library 157 which contains special sound elements. Each sound in the MIDI bit stream is compared by a feature recognition subsystem 158 to the MIDI sound elements in the MIDI library 154. The closest element in the MIDI library segment 154 is selected, and a symbolically coded identifier of this MIDI element is obtained. Similarly, each sound in the wavetable bit stream is compared to the wavetable sound elements in the wavetable library 156. The closest element in the wavetable library is selected, and a coded identifier of this wavetable element is obtained. Various metrics of correlation can be employed for determining the closest element.

The feature recognizer 150 is capable of forming a difference signal in dependence upon the nonvocal audio signal and the one of the sound elements. A representation of the difference signal is stored in the special library 157. A difference signal can be formed between the MIDI bit stream and a MIDI sound element, between the wavetable bit stream and a wavetable sound element, or between the special library bit stream and a special library sound element. The stored difference signals comprise a personality file which is used to modify the sound presentation produced by a subsequently-described decoder. More specifically, the personality file may include information relating to the relative volume, timbre, and other special characteristics of used to modify each of the sound elements. Moreover, the personality file may include representations of unique sounds in which a highly-correlated element in any of the libraries does not exist.

The feature recognizer 150 includes a variable length coder for the MIDI, wavetable and special library coded identifiers for application to a multiplexer 160. The multiplexer 160 multiplexes each of the symbolically coded identifiers with any special personality files, unrecognized signal portions, and timing information to produce the encoded nonvocal signal. In a preferred embodiment, the encoded non-vocal signal is in the form of a serial bit stream. The output of the second encoder 12 is applied to the multiplexer 14, as is the output of the first encoder 10, to provide a combined coded output for transmission to a corresponding decoder.

Each of the multiplexers 104, 160 and 54 may include a corresponding buffer to store a portion of a bit stream. This allows for management of the output bit stream subject to varying conditions on the input bit streams. Preferably, a reference clock is employed with presentation time stamps to align the input and the output of the multiplexers.

Figure 5:
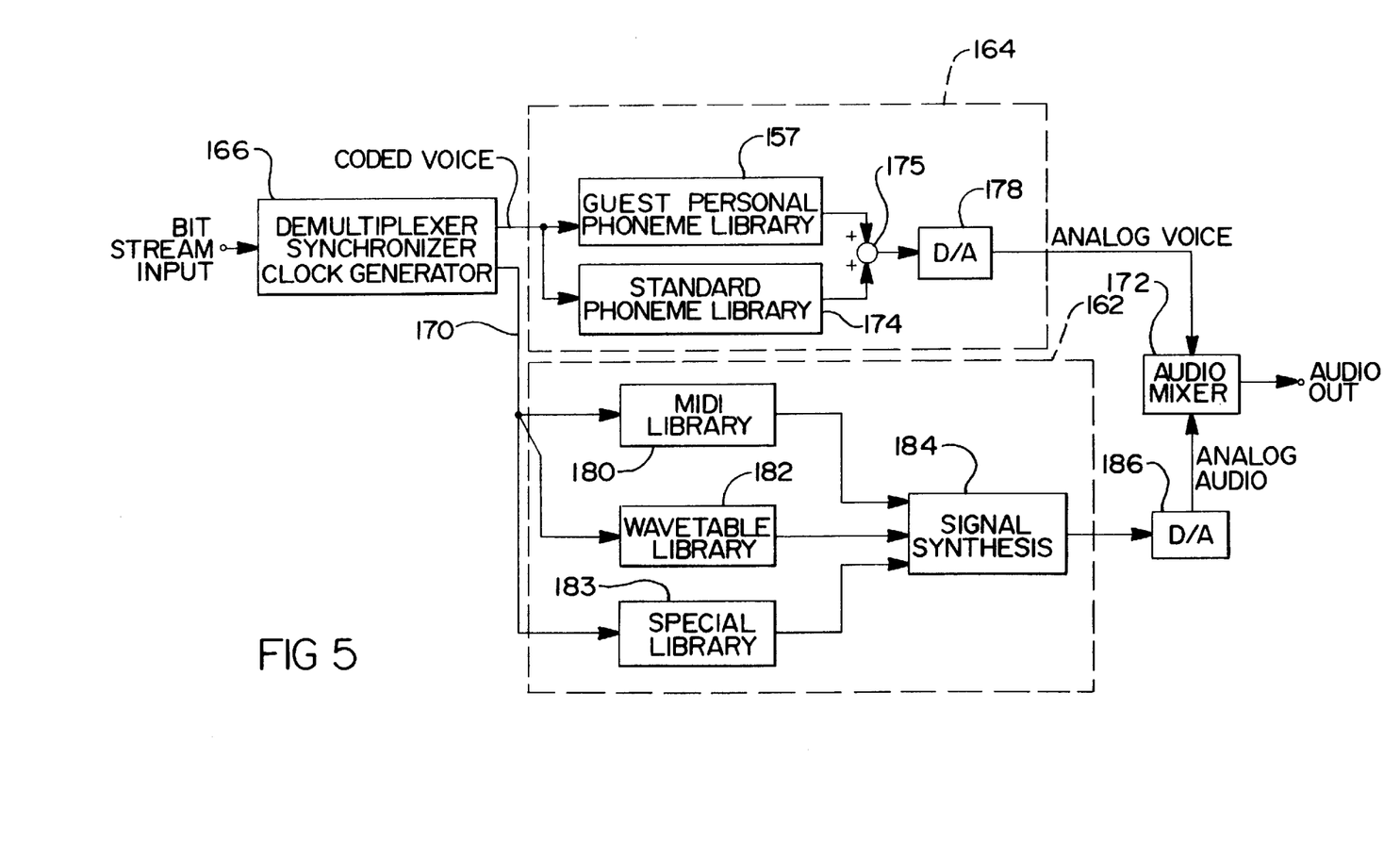
FIG. 5 is a block diagram of an embodiment of segment decoders for the aural content information encoded in encoder segments of FIG. 4.

In accordance with the present invention, an embodiment of a decoder/receiver for each segment 90 and 140 is illustrated by the block diagram in FIG. 5. The music segment decoder 162 and the speech segment decoder 164 provide a system for recreating an audio signals from a bit stream representative of an encoded audio signal received from a corresponding encoder 140 and 90, respectively. The bit stream enters a demultiplexer 166, which recovers a reference clock signal and generates an internal clock signal in order to phase lock onto the bit stream. The demultiplexer 166 is capable of performing a demultiplexing operation wherein an encoded vocal signal and an encoded music or nonvocal signal are extracted from the bit stream. In a preferred embodiment, the demultiplexer 166 decodes a transport layer which provides presentation time stamps, and segregates the incoming bit stream into an encoded vocal bit stream 168 and an encoded nonvocal bit stream 170 which are decompressed.

An audio mixer 172 is coupled to the first decoder 82 and the second decoder 84 to combine the decoded vocal signal and the decoded nonvocal signal, thus producing the recreated audio signal.

From the encoded vocal signal, the demultiplexer 166 is capable of extracting at least one difference signal representative of a difference between a user-spoken phoneme waveform and a corresponding phoneme waveform from a standard phoneme waveform set. In a preferred embodiment, the at least one difference signal is received within a header in the bit stream. The demultiplexer 166 provides the at least one difference signal to a storage device 173 within the first decoder 164. The storage device 173 stores a representation of the at least one difference signal. In a preferred embodiment, the demultiplexer 166 sends the header to the storage device 164. As a result, the storage device 173, which can be embodied by a standard DRAM, forms a guest personal phoneme library for the first decoder 164. The header can be sent once, for example during an initial stage of the transmission session to reduce the amount of information that must be continuously conveyed to send the complete message. Such a header transmission substantially reduces the bandwidth requirements for transmission.

The demultiplexer 166 is further capable of extracting at least one symbolic code as well as unrecognized data from the bit stream, so that decoder 164 receives the at least one symbolic code representative of a corresponding phoneme from a predetermined phoneme set in library 174 that corresponds to the library 100 in encoder 92. Each such library includes waveforms for each international phoneme set as well as a dictionary for transforming ASCII characters to speech. In a predetermined embodiment for English, the demultiplexer 166 blocks the encoded vocal bit stream into six-bit blocks, each representing a phoneme. The at least one symbolic code is applied to a standard phoneme waveform generator associated with the library 174 within the first decoder 164. The standard phoneme waveform generator generates a corresponding phoneme waveform from the standard waveform set for each of the at least one symbolic code. As a result, a recreated speech signal containing phonemes and unrecognized data, typically represented digitally at 176, is formed.

The output of the standard phoneme waveform generator 174 and the output of the storage device 173 are applied to a summing element 175. The summing element 175 combines the phoneme waveform from the standard waveform set with the difference signal in order to recreate the voice of the original speaker. The output of the summing element 175 is applied to a digital-to-analog converter 178 in order to form an analog recreated speech signal.

The analog recreated speech from the convertor 178 signal forms the decoded vocal signal which is applied to the audio mixer 172.

An embodiment of the decoder 162 extracts the encoded nonvocal signal 170 from the demultiplexer 80 that includes a plurality of symbolic encoded signals based upon the plurality of predetermined signal classes such as a MIDI library 180, a wavetable library 182, and a special library 183 corresponding to the libraries 154, 156 and 157, respectively, in the encoder 140. Each such library preferably includes waveforms for notes of various musical instruments as well as waveforms for discrete sounds such as bell ringing, animal noises, chimes, telephone ringing and other selected reproductions.

The MIDI encoded signal is applied to a MIDI symbolic decoder 100 which contains a library of MIDI sound elements. The MIDI symbolic library 180 includes a decompressor that generates at least one of the MIDI sound elements in response to receiving the MIDI encoded signal. Similarly, the wavetable encoded signal is applied to wavetable library 182 with a wavetable symbolic decoder for generating wavetable sound elements. The wavetable decoder generates at least one of the wavetable sound elements in response to receiving the wavetable encoded signal. The library 180 corresponds to the library 154 while the library 182 has content corresponding to the objects in library 156. The special library encoded signal is applied to a special library decoder 183 which contains a special library of sound elements. The special library decoder 183 generates at least one of the special library sound elements in response to receiving the special library encoded signal. In a preferred embodiment, the header information of the encoded nonvocal bit stream is used to identify each sound element to be played.

A signal synthesizer 184 is coupled to the MIDI symbolic library 180, the wavetable symbolic library 182, and special library decoder 183 to construct the nonvocal audio signal based upon the generated sound elements prior to the addition of the vocal audio in the mixer 172. The signal synthesizer 184 constructs the nonvocal audio signal based upon timing information provided by time stamps and other descriptive information. The output of the signal synthesizer 184 is applied to a digital-to-analog convertor 186, which provides an analog nonvocal audio signal for application to the audio mixer 172. The audio mixer 172 combines the vocal and nonvocal audio signals for presentation to the user.

In an alternative embodiment, the digital-to-analog converters 178 and 186 are eliminated. The mixed digital signal produced by the audio mixer 172 can be converted to analog by a digital-to-analog converter coupled to the output of the audio mixer 172. However, the step of converting the mixed signal to an analog form is optional.

The above-described embodiments of an encoder and a decoder in accordance with the present invention work together as follows. When information in the personality library 40 or the special library 66 are updated to include new features, the database in the decoder special library 104 is updated accordingly. When the new feature is encountered for the first time, the entire delta is transmitted along with a library identification number. The second time the new feature is encountered, only the library identification number needs to be sent from the encoder to the decoder.

The above-described versions of the present invention have many advantages. By utilizing tables of symbolic codes such as MIDI, wavetables, and special symbolic tables, a full representation of nonvocal audio signals can be encoded and transmitted at a significantly reduced bit rate. By transmitting a personality file together with the table codes and timing information, the nonvocal audio presentation can be modified to include special characteristics of the sound such as relative volume and timbre. Moreover, the personality file allows the encoding and transmission of unique sounds which do not have a highly-correlated counterpart in any of the tables. Further, storing large libraries in the decoder results in a substantial reduction in the required transmission bit rate, and analogously the required storage capacity.

Embodiments of the present invention can be applied to such audio products as compact disk players and digital audio players, and to audio transmission systems such as radio, television and videophone.

Similar encoder and decoder branches may be employed in processing information signals related to graphics. In such an instance, the encoder and the decoder will include the corresponding library contents. The library content may include a text to video text generator, geometric primitives, a scrolling text engine and CAD/Postscript features for symbolically encoding and decoding objects contained in the information signals delivered to the encoder and the decoder.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

The three types of services (video, speech, and general audio) are described herein separately. However, all can be combined to form a complete audio/video (AW) service. Likewise, a similar encoder/decoder for graphics is envisioned in the general case and can be combined with the A/V services.

What is claimed is:

1. A system for transferring a direct broadcast satellite transmitter having an encoder and a direct broadcast satellite receiver having a decoder, comprising:

said encoder including a segment selector for identifying a signal segment from the group of speech, audio, video and graphic signals, each selected segment comprising a representation of an information quantity;

wherein said encoder includes a plurality of encoder libraries, one of said libraries containing a representation of a generic information quantity partly corresponding to said information quantity, a symbolic code for the representation of said generic information quantity, and a difference signal personalization layer including the difference between said information quantity and said generic information quantity; and said decoder having a second plurality of libraries corresponding to said plurality of encoder libraries, and one of said decoder libraries containing said generic information quantity, said symbolic code corresponding to said generic information quantity and said difference signal personalization layer.

2. The invention as defined in claim 1 wherein said encoder includes a header encoder for preparing said difference signal as a header, and a transmitter for transmitting said header at a beginning of a transmission session.

3. A direct broadcast satellite system for encoding a signal into a bit stream, the signal representing of data including data representing at least one object, the system comprising:

a segment selector for selecting feature quantities of a data information signal from aural or visual information signals;

an object encoder with a generic object library, said library assigning a symbolic code to a generic object portion contained in the at least one object frame, wherein the symbolic code identifies a corresponding generic object from a set of generic objects in said generic object library, and a second library coupled to the object encoder containing a personalized signal portion computed as the generalized difference signal between said generic object portion and said data information signal;

a processor combining said personalized signal portion and said generic object portion.

4. The system of claim 3 wherein the library includes a first storage device which contains the set of generic objects.

5. The system of claim 4 wherein the library of the encoder stores said personalized signal portion as an object in the first storage device.

6. The system of claim 3 wherein the object encoder includes a visual image segment with at least one video image frame segmented into at least one object.

7. The system of claim 3 wherein the encoder includes a feature extractor which forms at least one feature quantity for the object.

8. The system of claim 7 wherein the encoder includes a classifier, coupled to the feature extractor, which determines the corresponding generic object based upon the at least one feature quantity.

9. The system of claim 3 further comprising a mapper which forms a transformed signal in dependence upon the video signal, and provides the transformed signal to the object encoder.

10. The system of claim 3 further comprising a variable length coder, coupled to the processor which provides a variable length coding of the bit stream.

11. The system of claim 3 further comprising a motion estimator which performs a comparison of a first video frame to a second video frame, and provides a representation of the comparison to the multiplexer.

12. A method of encoding a signal representative of a sequence of at least one feature from an aural or visual signal representation into a bit stream, the method of comprising the steps of:

segmenting said sequence into objects and unrecognized features;

assigning a symbolic code to an object contained in the at least one feature, wherein the symbolic code identifies a corresponding generic object from a set of generic objects in a generic object library;

determining the difference between said object and said corresponding generic object and coding this difference as a personalization layer; and multiplexing the coded difference and the symbolic code to form the bit stream containing a generic object and a personalization layer.

13. A system for reconstructing an information sequence with at least one feature from a bit stream representative of an encoded signal having symbolic codes and difference signals distinguishing a complete object from a generic object, the system comprising:

a demultiplexer which extracts said symbolic code and said difference signal from the encoded signal, wherein the symbolic code identifies a corresponding generic object from a set of generic objects in a generic object library; and an object generator, coupled to the demultiplexer, which forms the sequence by generating the corresponding generic object identified by the symbolic code from the generic object library, and modifying the corresponding generic object in dependence upon the difference signal.

14. A method of reconstructing an information sequence with at least one feature from a bit stream representative of a sequence of at least one feature from an aural or visual signal representation signal, the method comprising the steps of:

extracting a symbolic code and a difference signal from the representation signal, wherein the symbolic code identifies a corresponding generic object from a set of generic objects in a generic object library and said difference signal identifies a personalization layer portion of said at least one feature for modifying said corresponding generic object;

generating the corresponding generic object in dependence upon the symbolic code from said generic object library; and generating a sequence of at least one feature from the corresponding generic object and said difference signal.

15. The invention as defined in claim 1 wherein said encoder encodes and said decoder decodes video, speech general audio and graphics into a single A/V bitstream.

16. The invention as defined in claim 1 wherein said system includes a multiplexer that transmits personalization for all segments of said group as a header for the session.

17. The invention as defined in claim 16 wherein said decoder temporarily stores the personalization information from the session header in a guest personalization library in the decoder.

18. The invention as defined in claim 15 wherein said A/V stream includes the text of speech.

* * * * *